(12) United States Patent
Du et al.

(10) Patent No.: US 12,536,821 B2
(45) Date of Patent: Jan. 27, 2026

(54) METHOD AND APPARATUS FOR RECOGNIZING TEXT, DEVICE AND STORAGE MEDIUM

(71) Applicant: Beijing Baidu Netcom Science Technology Co., Ltd., Beijing (CN)

(72) Inventors: Yuning Du, Beijing (CN); Yehua Yang, Beijing (CN); Chenxia Li, Beijing (CN); Qiwen Liu, Beijing (CN); Xiaoguang Hu, Beijing (CN); Dianhai Yu, Beijing (CN); Yanjun Ma, Beijing (CN); Ran Bi, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 530 days.

(21) Appl. No.: 17/861,741

(22) Filed: Jul. 11, 2022

(65) Prior Publication Data
US 2022/0343662 A1   Oct. 27, 2022

(30) Foreign Application Priority Data

Dec. 10, 2021   (CN) .......................... 202111504537.8

(51) Int. Cl.
*G06V 30/14* (2022.01)
*G06V 10/82* (2022.01)
*G06V 30/19* (2022.01)

(52) U.S. Cl.
CPC .......... *G06V 30/1448* (2022.01); *G06V 10/82* (2022.01); *G06V 30/19147* (2022.01)

(58) Field of Classification Search
CPC ............... G06V 30/1448; G06V 10/82; G06V 30/19147; G06V 10/25; G06V 20/62; G06N 3/045; G06N 3/08; G06F 18/214

USPC ......................................................... 382/156
See application file for complete search history.

(56) References Cited

U.S. PATENT DOCUMENTS

2023/0064122 A1\*   3/2023   Hu ....................... G06V 30/287

FOREIGN PATENT DOCUMENTS

| CN | 111242126 A | 1/2020 |
|---|---|---|
| CN | 111860479 A | 10/2020 |
| CN | 113313111 A | 8/2021 |
| CN | 113392827 A | 9/2021 |

(Continued)

OTHER PUBLICATIONS

Mombach, Jaline, et al. "Mirrored and rotated letters in children spellings: An automatic analysis approach." 2020 IEEE Canadian Conference on Electrical and Computer Engineering (CCECE). IEEE, 2020. (Year: 2020).\*

(Continued)

*Primary Examiner* — Jonathan S Lee
(74) *Attorney, Agent, or Firm* — Knobbe, Martens, Olson & Bear, LLP (57) ABSTRACT

The present disclosure provides a method and apparatus for recognizing a text, a device and a storage medium, and relates to the field of deep learning technology. A specific implementation comprises: receiving a target image; performing a text detection on the target image using a pre-trained lightweight text detection network, to obtain a text detection box; and recognizing a text in the text detection box using a pre-trained lightweight text recognition network, to obtain a text recognition result.

9 Claims, 4 Drawing Sheets

(56) References Cited

FOREIGN PATENT DOCUMENTS

| CN | 113569608 A | * | 10/2021 |
| CN | 113627439 A | | 11/2021 |
| JP | 2002157074 A | | 5/2002 |
| JP | 2006260274 A | | 9/2006 |
| JP | 2017173925 A | | 9/2017 |

OTHER PUBLICATIONS

Aakash, B., and A. Srilakshmi. "MAGE: An Efficient Deployment of Python Flask Web Application to App Engine Flexible Using Google Cloud Platform." Inventive Communication and Computational Technologies: Proceedings of ICICCT 2020. Springer Singapore, 2021. (Year: 2021).*

Henge, Santosh Kumar, and B. Rama. "OCR-mirror image reflection approach: Document back side character recognition by using neural fuzzy hybrid system." 2017 IEEE 7th International Advance Computing Conference (IACC). IEEE, 2017. (Year: 2017).*

Chen, Chen, et al. "Refinedetlite: A lightweight one-stage object detection framework for cpu-only devices." Proceedings of the IEEE/CVF conference on computer vision and pattern recognition workshops. 2020. (Year: 2020).*

Du et al., "PP-OCR: A Practical Ultra Lightweight OCR System," arXiv abs/2009.09941v2, dated Oct. 2020 in 14 pages.

Xiabi et al., "Artificial Intelligence—Machine Learning and Neural Networks," National Defense Industry Press, dated Aug. 1, 2020 in 9 pages.

"After quixia explores the best installation pruning of the edge DNN, it quantizes it in the unit of filter." Nikkei robotics 73 Nikkei Business Publications, Inc., Finishing No. 2022P106_Sending No. 338613 Sending date: Ling He, and Jul. 4, 2005 in 12 pages.

"Proposal for distillation method of DNN using snapshot merging." The Institute of Electronics Information and Communication Engineers, Finishing No. 2022P106_Sending No. 338612 Sending date: Ling He, Jul. 4, 2005 in 12 pages.

China Federation of Network Social Organizations Network Protection Series for Minors, "Artificial Intelligence for Children" (2021).

PyTorch, "Object Detection by Deep Learning: Core Technologies and Practices," China Machine Press, 5 pages, Mar. 31, 2020.

* cited by examiner

METHOD AND APPARATUS FOR RECOGNIZING TEXT, DEVICE AND STORAGE MEDIUM

CROSS-REFERENCE TO RELATED APPLICATIONS

This application claims priority to Chinese Patent Application No. 202111504537.8, filed with the China National Intellectual Property Administration (CNIPA) on Dec. 10, 2021, the contents of which are incorporated herein by reference in their entirety.

TECHNICAL FIELD

The present disclosure relates to the field of computer technology, specifically to the field of deep learning technology, and particularly to a method and apparatus for recognizing a text, a device and a storage medium.

BACKGROUND

OCR (Optical Character Recognition) is a technology of extracting text information from an image. At present, this task has a wide range of application scenarios, including scenarios where a text needs to be extracted for recognition, for example, annotating plaques and road signs during map production, extracting card and bill information and inputting the information for review, factory automation, electronization of documents such as documents of government departments and hospitals, and online education.

SUMMARY

The present disclosure provides a method and apparatus for recognizing a text, a device and a storage medium.

In a first aspect, embodiments of the present disclosure provide a method for recognizing a text, comprising: receiving a target image; performing a text detection on the target image using a pre-trained lightweight text detection network, to obtain a text detection box; and recognizing a text in the text detection box using a pre-trained lightweight text recognition network, to obtain a text recognition result.

In a second aspect, embodiments of the present disclosure provide an apparatus for recognizing a text, comprising: an image receiving unit, configured to receive a target image; a text detecting unit, configured to perform a text detection on the target image using a pre-trained lightweight text detection network, to obtain a text detection box; and a text recognizing unit, configured to recognize a text in the text detection box using a pre-trained lightweight text recognition network, to obtain a text recognition result.

In a third aspect, embodiments of the present disclosure provide an electronic device, comprising: one or more processors; and a memory, storing one or more programs, wherein the one or more programs, when executed by the one or more processors, cause the one or more processors to implement the method provided by the first aspect.

In a fourth aspect, embodiments of the present disclosure provide a computer-readable medium, storing a computer program thereon, wherein the program, when executed by a processor, causes the processor to implement the method provided by the first aspect.

In a fifth aspect, an embodiment of the present disclosure provides a computer program product, comprising a computer program, wherein the computer program, when executed by a processor, implements the method provided by the first aspect.

It should be understood that the content described in this part is not intended to identify key or important features of the embodiments of the present disclosure, and is not used to limit the scope of the present disclosure. Other features of the present disclosure will be easily understood through the following description.

BRIEF DESCRIPTION OF THE DRAWINGS

The accompanying drawings are used for a better understanding of the scheme, and do not constitute a limitation to the present disclosure. Here.

DETAILED DESCRIPTION OF EMBODIMENTS

Exemplary embodiments of the present disclosure are described below in combination with the accompanying drawings, and various details of the embodiments of the present disclosure are included in the description to facilitate understanding, and should be considered as exemplary only. Accordingly, it should be recognized by one of ordinary skill in the art that various changes and modifications may be made to the embodiments described herein without departing from the scope and spirit of the present disclosure. Also, for clarity and conciseness, descriptions for well-known functions and structures are omitted in the following description.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
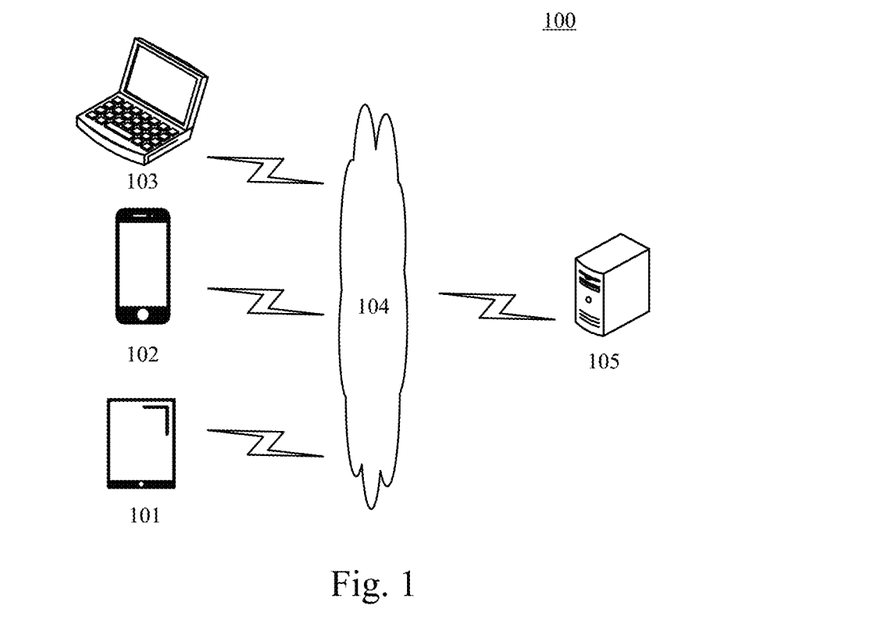
FIG. 1 is a diagram of an exemplary system architecture in which an embodiment of the present disclosure may be applied.

FIG. 1 illustrates an exemplary system architecture 100 in which an embodiment of a method for recognizing a text or an apparatus for recognizing a text according to the present disclosure may be applied.

As shown in FIG. 1, the system architecture 100 may include terminal devices 101, 102 and 103, a network 104, and a server 105. The network 104 serves as a medium providing a communication link between the terminal devices 101, 102 and 103 and the server 105. The network 104 may include various types of connections, for example, wired or wireless communication links, or optical fiber cables.

A user may use the terminal devices 101, 102 and 103 to interact with the server 105 via the network 104 to receive or send a message, etc. Various communication client applications (e.g., a scanning application and an image processing application) may be installed on the terminal devices 101, 102 and 103.

The terminal devices 101, 102 and 103 may be hardware or software. When being the hardware, the terminal devices 101, 102 and 103 may be various electronic devices, the electronic devices including, but not limited to, a smartphone, a tablet computer, an e-book reader, a vehicle-mounted computer, a laptop portable computer, a desktop computer, etc. When being the software, the terminal devices 101, 102 and 103 may be installed in the above listed electronic devices. The terminal devices may be implemented as a plurality of pieces of software or a plurality of software modules (e.g., software or software modules for providing a distributed service), or as a single piece of software or a single software module, which will not be specifically limited here.

The server 105 may be a server providing various services, for example, a backend server providing a model for text processing on the terminal devices 101, 102 and 103. The backend server may train various lightweight network models and feed back the trained lightweight network models to the terminal devices 101, 102 and 103.

It should be noted that the server 105 may be hardware or software. When being the hardware, the server 105 may be implemented as a distributed server cluster composed of a plurality of servers, or as a single server. When being the software, the server 105 may be implemented as a plurality of pieces of software or a plurality of software modules (e.g., software or software modules for providing a distributed service), or as a single piece of software or a single software module, which will not be specifically limited here.

It should be noted that the method for recognizing a text provided by the embodiments of the present disclosure may be performed by the terminal devices 101, 102 and 103, or performed by the server 105. Correspondingly, the apparatus for recognizing a text may be provided in the terminal devices 101, 102 and 103, or provided in the server 105.

It should be appreciated that the numbers of the terminal devices, the networks, and the servers in FIG. 1 are merely illustrative. Any number of terminal devices, networks, and servers may be provided based on actual requirements.

Figure 2:
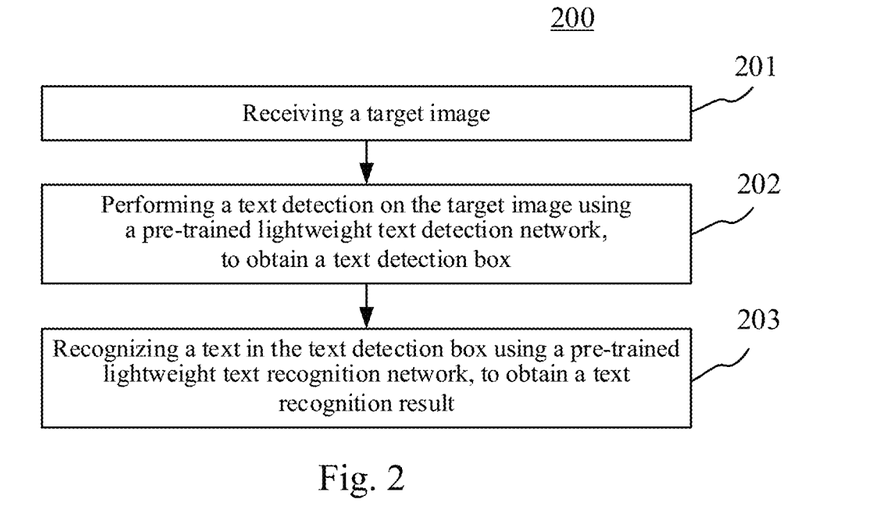
FIG. 2 is a flowchart of an embodiment of a method for recognizing a text according to the present disclosure.

Further referring to FIG. 2, FIG. 2 illustrates a flow 200 of an embodiment of a method for recognizing a text according to the present disclosure. The method for recognizing a text in this embodiment includes the following steps.

Step 201, receiving a target image.

In this embodiment, an executing body of the method for recognizing a text may receive the target image in various ways. For example, the executing body may obtain the target image by performing scanning, or by photographing various plaques. The target image may include at least one text, which may be Chinese, letters, or the like.

Step 202, performing a text detection on the target image using a pre-trained lightweight text detection network, to obtain a text detection box.

After receiving the target image, the executing body may perform the text detection on the target image using the pre-trained lightweight text detection network, to obtain the text detection box. The lightweight text detection network herein may be a backbone network suitable for use by a mobile terminal, for example, a MobileNet (a lightweight deep neural network is constructed using a depthwise separable convolution based on a streamline architecture), a ShuffleNet, and other series of models. In addition, in order to further lighten the network, the number of channels of a detection head may be reduced. The above lightweight text detection network may be trained and obtained by various means, for example, by distillation, or by training using a training sample. The above lightweight text detection network may annotate the detected text using the text detection box. The above text detection box may be a rectangle, and the above rectangle may be the minimum circumscribed rectangle of the connected domain of the text.

Step 203, recognizing a text in the text detection box using a pre-trained lightweight text recognition network, to obtain a text recognition result.

After obtaining the text detection box, the executing body may further recognize the text in the text detection box using the pre-trained lightweight text recognition network, to obtain the text recognition result. The above lightweight text recognition network may also be a backbone network suitable for use by a mobile terminal. The structure of the lightweight text recognition network may be the same as or different from that of the lightweight text detection network. Further, in order to reduce the volume of the lightweight text recognition network, the number of channels of a detection head may be further reduced. The text recognition result may include various recognized characters, for example, Chinese characters, and letters. Further, in order for the user to understand the performance of the text recognition network, the executing body may further display the confidence level of each text.

Figure 3:
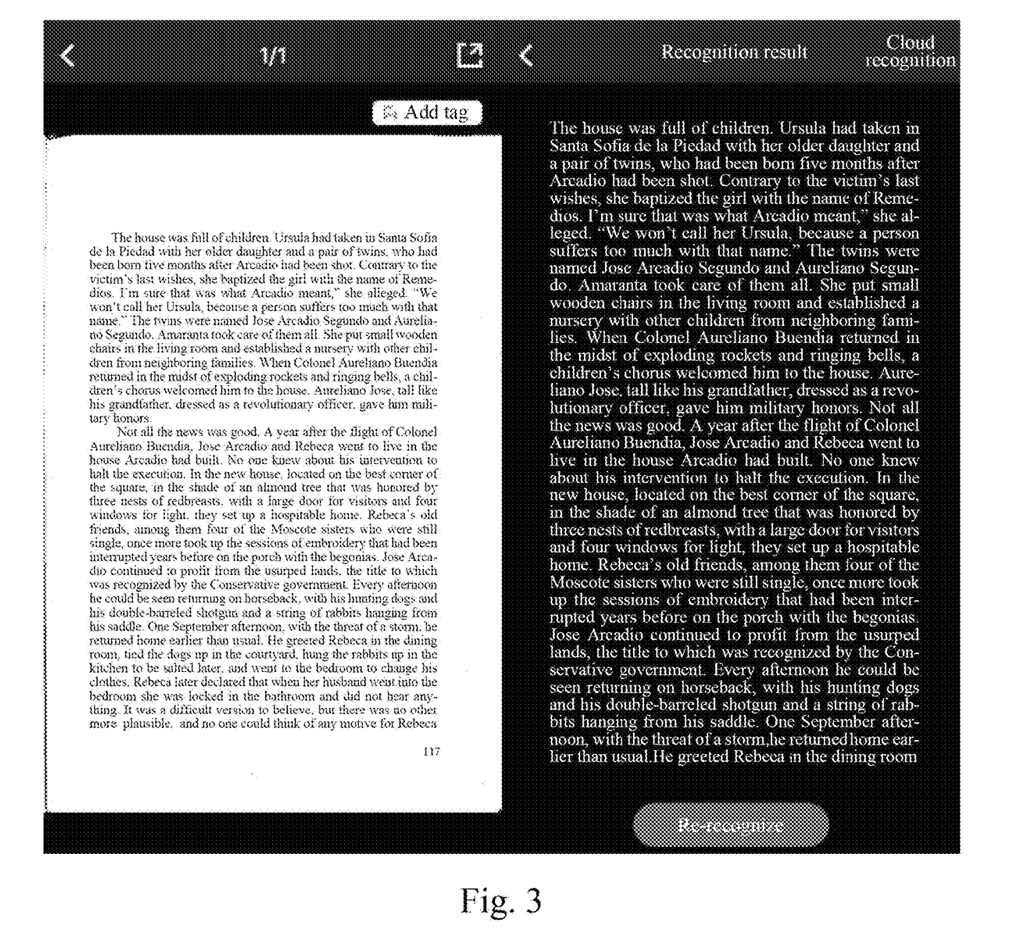
FIG. 3 is a schematic diagram of an application scenario of the method for recognizing a text according to the present disclosure.

Further referring to FIG. 3, FIG. 3 is a schematic diagram of an application scenario of the method for recognizing a text according to the present disclosure. In the application scenario of FIG. 3, a user scans an image of a file through a terminal, and uses the above image as a target image for further processing. A lightweight text detection network and a lightweight text recognition network are installed in the terminal, such that the terminal can perform a text detection and a text recognition on the above target image to obtain a text recognition result. The user may perform an operation such as editing and copying on the text recognition result, to modify or edit the text recognition result.

According to the method for recognizing a text provided in the above embodiment of the present disclosure, the text recognition can be performed using the lightweight network, which improves the efficiency of the text recognition, without high requirements on hardware.

Figure 4:
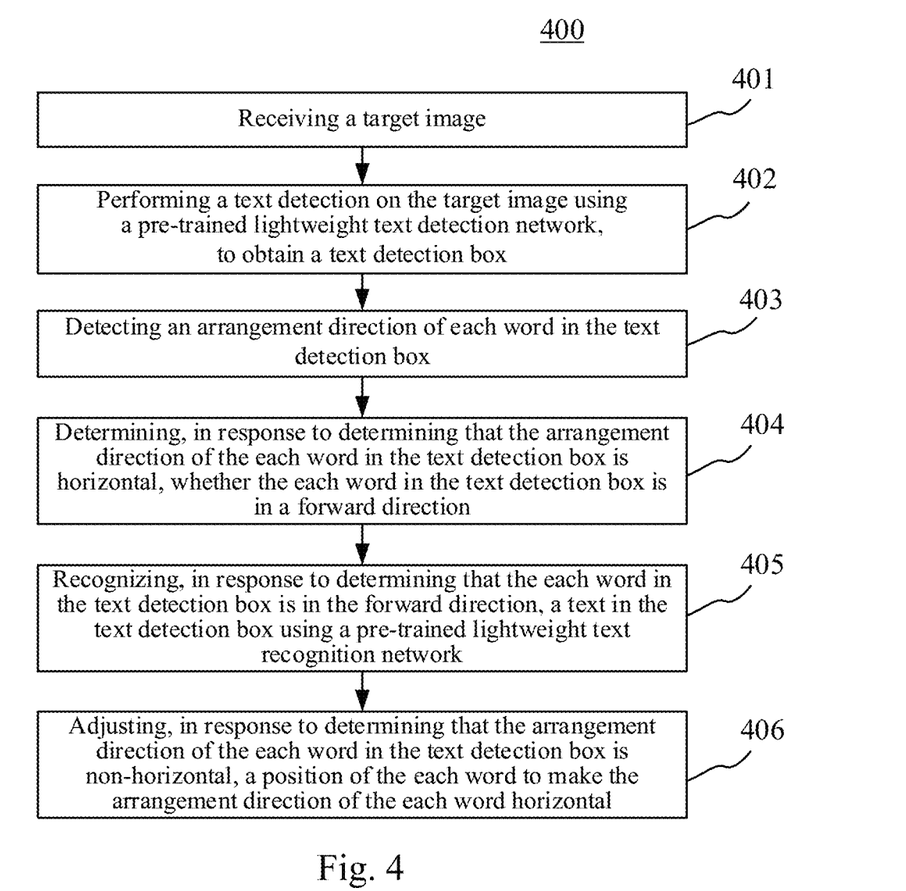
FIG. 4 is a flowchart of another embodiment of the method for recognizing a text according to the present disclosure.

Further referring to FIG. 4, FIG. 4 illustrates a flow 400 of another embodiment of the method for recognizing a text according to the present disclosure. As shown in FIG. 4, the method in this embodiment may include the following steps.

Step 401, receiving a target image.

Step 402, performing a text detection on the target image using a pre-trained lightweight text detection network, to obtain a text detection box.

Step 403, detecting an arrangement direction of each word in the text detection box.

After determining each text detection box, the executing body may further determine the arrangement direction of the each word in the text detection box. Specifically, the executing body may perform various image processing on a text image in the text detection box to determine a rectangular box of the each word. The arrangement direction of the each word is determined according to the position of the rectangular box of the each word. The arrangement direction may include a horizontal direction, a vertical direction, and an oblique direction.

Step 404, determining, in response to determining that the arrangement direction of the each word in the text detection box is horizontal, whether the each word in the text detection box is in a forward direction.

If the executing body determines that the arrangement direction of the each word in the text detection box is horizontal, the executing body may further detect whether the each word in the text detection box is in the forward direction. The forward direction refers to the correct direction of the word, and the non-forward direction may include a lateral direction, a reverse direction, and the like, that is, the non-forward direction needs to be changed to the forward direction through rotation or mirroring.

Step 405, recognizing, in response to determining that the each word in the text detection box is in the forward direction, a text in the text detection box using a pre-trained lightweight text recognition network.

If the executing body further determines that the each word in the text detection box is in the forward direction, the executing body may recognize the text in the text detection box using the pre-trained lightweight text recognition network. In this way, the accuracy of the text recognition can be effectively improved.

Step 406, adjusting, in response to determining that the arrangement direction of the each word in the text detection box is non-horizontal, a position of the each word to make the arrangement direction of the each word horizontal.

In this embodiment, if the executing body determines that the arrangement direction of the each word in the text detection box is non-horizontal, the executing body may adjust the position of the each word to make the arrangement direction of the each word horizontal. At the time of adjustment, the executing body may determine the first word in words, and change the positions of other words with the position of the first word as a reference. In some specific practices, the executing body may also implement the adjusting on the position of the word using a lightweight network.

In some alternative implementations of this embodiment, the above lightweight text detection network and/or the above lightweight text recognition network are trained and obtained by distillation. Through this training approach, not only the performance or effect of the lightweight network can be ensured, but also the training efficiency can be improved.

In some alternative implementations of this embodiment, to further reduce the volume of the above lightweight text detection network and/or the volume of the above lightweight text recognition network, the parameter of lightweight text detection network and/or the parameter of the lightweight text recognition network may be converted to an integer number. Specifically, the executing body may adjust the type of the parameter through various quantization methods, for example, may quantize a model parameter from a floating point type to an integer type through an offline quantization method, or a PACT, thereby achieving the purpose of further reducing the size of the model.

According to the method for recognizing a text provided in the above embodiment of the present disclosure, the volumes of the text detection network and the text recognition network can be reduced in various ways, to further compress the volume of the OCR system, which facilitates the application of the OCR system in a terminal.

Figures 5, 6:
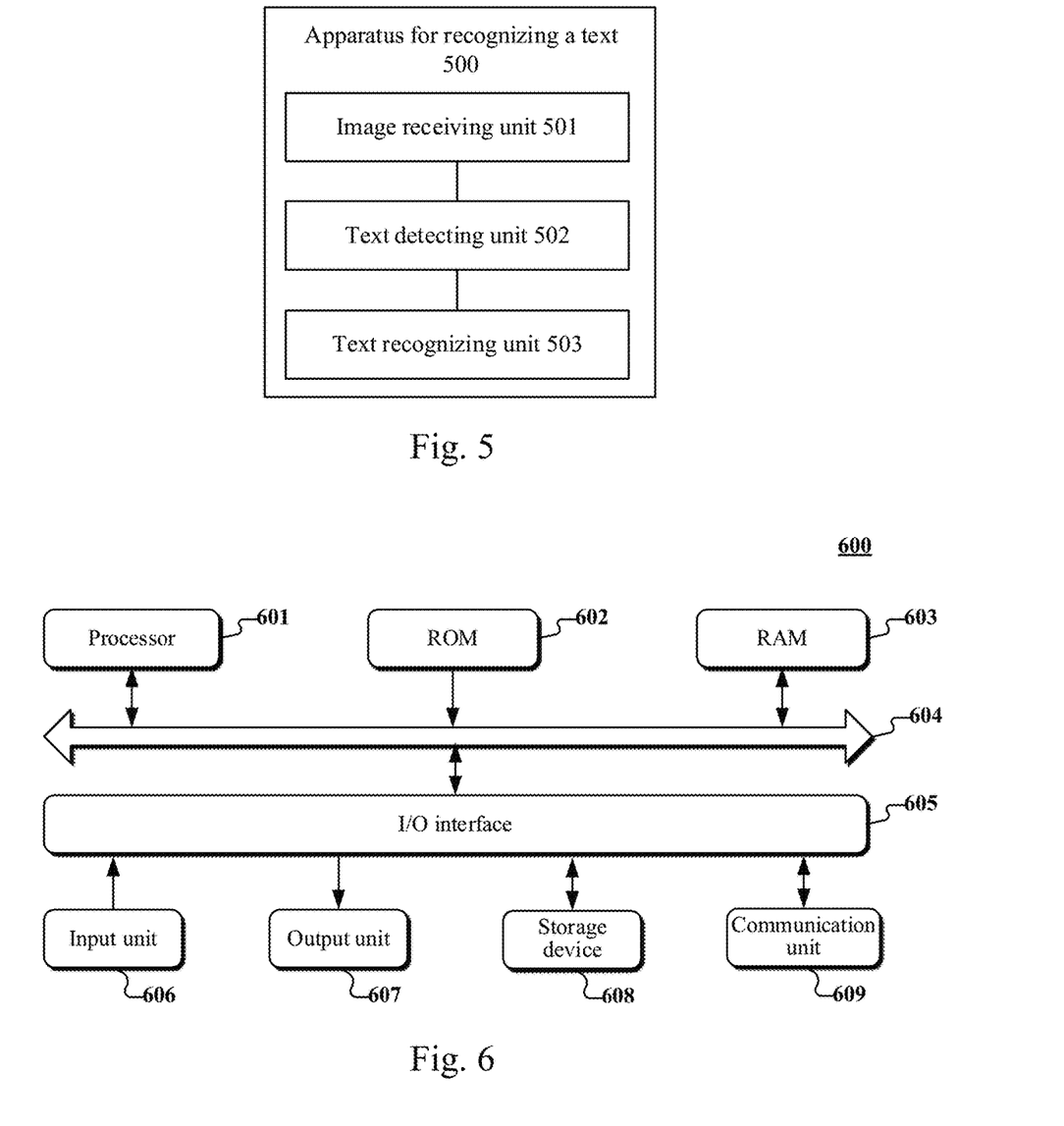
FIG. 5 is a schematic structural diagram of an embodiment of an apparatus for recognizing a text according to the present disclosure.
FIG. 6 is a block diagram of an electronic device used to implement the method for recognizing a text according to the embodiments of the present disclosure.

Further referring to FIG. 5, as an implementation of the method shown in the above drawings, the present disclosure provides an embodiment of an apparatus for recognizing a text. The embodiment of the apparatus corresponds to the embodiment of the method shown in FIG. 2. The apparatus may be applied in various electronic devices.

As shown in FIG. 5, the apparatus 500 for recognizing a text in this embodiment includes: an image receiving unit 501, a text detecting unit 502 and a text recognizing unit 503.

The image receiving unit 501 is configured to receive a target image.

The text detecting unit 502 is configured to perform a text detection on the target image using a pre-trained lightweight text detection network, to obtain a text detection box.

The text recognizing unit 503 is configured to recognize a text in the text detection box using a pre-trained lightweight text recognition network, to obtain a text recognition result.

In some alternative implementations of this embodiment, the text recognizing unit 503 may be further configured to: detect an arrangement direction of each word in the text detection box; and recognize, in response to determining that the arrangement direction of the each word in the text detection box is horizontal, the text in the text detection box using the pre-trained lightweight text recognition network.

In some alternative implementations of this embodiment, the apparatus may further include a position adjusting unit. The position adjusting unit is configured to: adjust, in response to determining that the arrangement direction of the each word in the text detection box is non-horizontal, a position of the each word to make the arrangement direction of the each word horizontal.

In some alternative implementations of this embodiment, the text recognizing unit 503 may be further configured to: determine whether the each word in the text detection box is in a forward direction; and recognize, in response to determining that the each word in the text detection box is in the forward direction, the text in the text detection box using the pre-trained lightweight text recognition network.

In some alternative implementations of this embodiment, the lightweight text detection network and/or the lightweight text recognition network are trained and obtained by distillation.

In some alternative implementations of this embodiment, the apparatus may further include a parameter converting unit. The parameter converting unit is configured to: convert a parameter of the lightweight text detection network and/or a parameter of the lightweight text recognition network into an integer number.

It should be understood that the described units 501-503 in the apparatus 500 for recognizing a text correspond to the steps in the method described with reference to FIG. 2, respectively. Thus, the operations and features described above with respect to the method for recognizing a text are also applicable to the apparatus 500 and the units contained therein, and thus will not be repeatedly described here.

In the technical solution of the present disclosure, the collection, storage, use, processing, transmission, provision, disclosure, etc. of the personal information of a user all comply with the provisions of the relevant laws and regulations, and do not violate public order and good customs.

According to an embodiment of the present disclosure, the present disclosure further provides an electronic device, a readable storage medium and a computer program product.

FIG. 6 is a block diagram of an electronic device 600 of the method for recognizing a text according to the embodiments of the present disclosure. The electronic device is intended to represent various forms of digital computers such as a laptop computer, a desktop computer, a workstation, a personal digital assistant, a server, a blade server, a mainframe computer, and other appropriate computers. The electronic device may alternatively represent various forms of mobile apparatuses such as personal digital processing, a cellular telephone, a smart phone, a wearable device and other similar computing apparatuses. The parts shown herein, their connections and relationships, and their functions are only as examples, and not intended to limit implementations of the present disclosure as described and/or claimed herein.

As shown in FIG. 6, the electronic device 600 includes a processor 601, which may execute various appropriate actions and processes in accordance with a computer program stored in a read-only memory (ROM) 602 or a computer program loaded into a random access memory (RAM) 603 from a storage device 608. The RAM 603 also stores various programs and data required by operations of the electronic device 600. The processor 601, the ROM 602 and the RAM 603 are connected to each other through a bus 604. An input/output (I/O) interface 605 is also connected to the bus 604.

The following components in the electronic device 600 are connected to the I/O interface 605: an input unit 606, for example, a keyboard and a mouse; an output unit 607, for example, various types of displays and a speaker; a storage device 608, for example, a magnetic disk and an optical disk; and a communication unit 609, for example, a network card, a modem, a wireless communication transceiver. The communication unit 609 allows the electronic device 600 to exchange information/data with an other device through a computer network such as the Internet and/or various telecommunication networks.

The processor 601 may be various general-purpose and/or special-purpose processing assemblies having processing and computing capabilities. Some examples of the processor 601 include, but not limited to, a central processing unit (CPU), a graphics processing unit (GPU), various dedicated artificial intelligence (AI) computing chips, various processors that run a machine learning model algorithm, a digital signal processor (DSP), any appropriate processor, controller and microcontroller, etc. The processor 601 performs the various methods and processes described above, for example, the method for recognizing a text. For example, in some embodiments, the method for recognizing a text may be implemented as a computer software program, which is tangibly included in a machine readable storage medium, for example, the storage device 608. In some embodiments, part or all of the computer program may be loaded into and/or installed on the electronic device 600 via the ROM 602 and/or the communication unit 609. When the computer program is loaded into the RAM 603 and executed by the processor 601, one or more steps of the above method for recognizing a text may be performed. Alternatively, in other embodiments, the processor 601 may be configured to perform the method for recognizing a text through any other appropriate approach (e.g., by means of firmware).

The various implementations of the systems and technologies described herein may be implemented in a digital electronic circuit system, an integrated circuit system, a field programmable gate array (FPGA), an application specific integrated circuit (ASIC), an application specific standard product (ASSP), a system-on-chip (SOC), a complex programmable logic device (CPLD), computer hardware, firmware, software and/or combinations thereof. The various implementations may include: being implemented in one or more computer programs, where the one or more computer programs may be executed and/or interpreted on a programmable system including at least one programmable processor, and the programmable processor may be a particular-purpose or general-purpose programmable processor, which may receive data and instructions from a storage system, at least one input device and at least one output device, and send the data and instructions to the storage system, the at least one input device and the at least one output device.

Program codes used to implement the method of embodiments of the present disclosure may be written in any combination of one or more programming languages. The above program codes could be packaged into a computer program product. These program codes or the computer program product may be provided to a processor or controller of a general-purpose computer, particular-purpose computer or other programmable data processing apparatus, so that the program codes, when executed by the processor 601, cause the functions or operations specified in the flowcharts and/or block diagrams to be implemented. These program codes may be executed entirely on a machine, partly on the machine, partly on the machine as a stand-alone software package and partly on a remote machine, or entirely on the remote machine or a server.

In the context of the present disclosure, the machine-readable storage medium may be a tangible medium that may include or store a program for use by or in connection with an instruction execution system, apparatus or device. The machine-readable storage medium may be a machine-readable storage signal medium or a machine-readable storage medium. The machine-readable medium may include, but is not limited to, an electronic, magnetic, optical, electromagnetic, infrared, or semiconductor system, apparatus or device, or any appropriate combination thereof. A more particular example of the machine-readable storage medium may include an electronic connection based on one or more lines, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination thereof.

To provide interaction with a user, the systems and technologies described herein may be implemented on a computer having: a display device (such as a CRT (cathode ray tube) or LCD (liquid crystal display) monitor) for displaying information to the user; and a keyboard and a pointing device (such as a mouse or a trackball) through which the user may provide input to the computer. Other types of devices may also be used to provide interaction with the user. For example, the feedback provided to the user may be any form of sensory feedback (such as visual feedback, auditory feedback or tactile feedback); and input from the user may be received in any form, including acoustic input, speech input or tactile input.

The systems and technologies described herein may be implemented in: a computing system including a background component (such as a data server), or a computing system including a middleware component (such as an application server), or a computing system including a front-end component (such as a user computer having a graphical user interface or a web browser through which the user may interact with the implementations of the systems and technologies described herein), or a computing system including any combination of such background component, middleware component or front-end component. The components of the systems may be interconnected by any form or medium of digital data communication (such as a communication network). Examples of the communication network include a local area network (LAN), a wide area network (WAN), and the Internet.

A computer system may include a client and a server. The client and the server are generally remote from each other, and generally interact with each other through the communication network. A relationship between the client and the server is generated by computer programs running on a corresponding computer and having a client-server relationship with each other. The server may be a cloud server, and could also be called cloud computing server or cloud host. It is a host product in the cloud computing service system to solve the problems existing in traditional physical hosts and VPS services ("Virtual Private Server", or "VPS" for short). The management is difficult and the business expansion is weak. A server can also be a distributed system server, or a server combined with a blockchain.

It should be appreciated that the steps of reordering, adding or deleting may be executed using the various forms shown above. For example, the steps described in embodiments of the present disclosure may be executed in parallel or sequentially or in a different order, so long as the expected results of the technical schemas provided in embodiments of the present disclosure may be realized, and no limitation is imposed herein.

The above particular implementations are not intended to limit the scope of the present disclosure. It should be appreciated by those skilled in the art that various modifications, combinations, sub-combinations, and substitutions may be made depending on design requirements and other factors. Any modification, equivalent and modification that fall within the spirit and principles of the present disclosure are intended to be included within the scope of the present disclosure.

What is claimed is:

1. A method performed on a terminal device for recognizing a text, comprising:
   receiving a digital target image comprising at least one text;
   performing a text detection on the digital target image using a pre-trained lightweight text detection network, to obtain a text detection box, wherein the pre-trained lightweight text detection network is obtained by reducing a number of channels of a detection head of a backbone network; and
   recognizing a text in the text detection box using a pre-trained lightweight text recognition network, to obtain a text recognition result,
   wherein recognizing the text in the text detection box using the pre-trained lightweight text recognition network comprises:
      detecting, by image processing by an executing body, an arrangement direction of each word in the text detection box;
      adjusting, in response to determining that the arrangement direction of each word in the text detection box is non-horizontal, a position of each word to make the arrangement direction of each word horizontal;
      determining, in response to determining that the arrangement direction of each word in the text detection box is horizontal, whether each word in the text detection box is in a forward direction;
      changing, within the text detection box, a non-forward direction of a first word to the forward direction through rotating or mirroring; and
      recognizing, in response to determining that each word in the text detection box is in the forward direction, the text in the text detection box using the pre-trained lightweight text recognition network.

2. The method according to claim 1, wherein the pre-trained lightweight text detection network and/or the pre-trained lightweight text recognition network are trained and obtained by distillation.

3. The method according to claim 1, further comprising:
   converting a parameter of the pre-trained lightweight text detection network and/or a parameter of the pre-trained lightweight text recognition network into an integer number.

4. An electronic device comprising a terminal, comprising:
   at least one processor; and
   a storage device that stores instructions that, when executed by the at least one processor, cause the at least one processor to perform operations for recognizing a text, the operations comprising:
      receiving a digital target image comprising at least one text;
      performing a text detection on the digital target image using a pre-trained lightweight text detection network, to obtain a text detection box, wherein the pre-trained lightweight text detection network is obtained by reducing a number of channels of a detection head of a backbone network; and
      recognizing a text in the text detection box using a pre-trained lightweight text recognition network, to obtain a text recognition result,
      wherein recognizing the text in the text detection box using the pre-trained lightweight text recognition network comprises:
         detecting, by image processing by an executing body, an arrangement direction of each word in the text detection box;
         adjusting, in response to determining that the arrangement direction of each word in the text detection box is non-horizontal, a position of each word to make the arrangement direction of each word horizontal;
         determining, in response to determining that the arrangement direction of each word in the text detection box is horizontal, whether each word in the text detection box is in a forward direction;
         changing, within the text detection box, a non-forward direction of a first word to the forward direction through rotating or mirroring; and
         recognizing, in response to determining that each word in the text detection box is in the forward direction, the text in the text detection box using the pre-trained lightweight text recognition network.

5. The electronic device according to claim 4, wherein the pre-trained lightweight text detection network and/or the pre-trained lightweight text recognition network are trained and obtained by distillation.

6. The electronic device according to claim 4, the operations further comprising:
   converting a parameter of the pre-trained lightweight text detection network and/or a parameter of the pre-trained lightweight text recognition network into an integer number.

7. A non-transitory computer readable storage medium, storing a computer instruction, wherein the computer instruction is used to cause a processor of a terminal to perform operations for recognizing a text, the operations comprising:
   receiving a digital target image comprising at least one text;

performing a text detection on the digital target image using a pre-trained lightweight text detection network, to obtain a text detection box, wherein the pre-trained lightweight text detection network is obtained by reducing a number of channels of a detection head of a backbone network; and recognizing a text in the text detection box using a pre-trained lightweight text recognition network, to obtain a text recognition result, wherein recognizing the text in the text detection box using the pre-trained lightweight text recognition network comprises:

detecting, by image processing by an executing body, an arrangement direction of each word in the text detection box;

adjusting, in response to determining that the arrangement direction of each word in the text detection box is non-horizontal, a position of each word to make the arrangement direction of each word horizontal;

determining, in response to determining that the arrangement direction of each word in the text detection box is horizontal, whether each word in the text detection box is in a forward direction;

changing, within the text detection box, a non-forward direction of a first word to the forward direction through rotating or mirroring; and recognizing, in response to determining that each word in the text detection box is in the forward direction, the text in the text detection box using the pre-trained lightweight text recognition network.

8. The non-transitory computer readable storage medium according to claim 7, wherein the pre-trained lightweight text detection network and/or the pre-trained lightweight text recognition network are trained and obtained by distillation.

9. The non-transitory computer readable storage medium according to claim 7, the operations further comprising:

converting a parameter of the pre-trained lightweight text detection network and/or a parameter of the pre-trained lightweight text recognition network into an integer number.

\* \* \* \* \*